United States Patent [19]
De Vita et al.

[11] 3,786,187
[45] Jan. 15, 1974

[54] APPARATUS FOR TESTING SYSTEMS AND DATA TRANSMITTING NETWORKS BY SIMULATION

[75] Inventors: Luciano De Vita; Emilio Mancini, both of Rome, Italy

[73] Assignee: Alitalia Linee Aeeree Italiane S.p.A., Rome, Italy

[22] Filed: Nov. 24, 1971

[21] Appl. No.: 201,842

[30] Foreign Application Priority Data
Mar. 23, 1970  Italy .............................. 49260 A/70

[52] U.S. Cl. ........................... 178/69 A, 179/175.3
[51] Int. Cl. ........................ H04b 3/46, H04l 25/02
[58] Field of Search ............... 179/175.31 R, 175.3; 178/69 A, 69 R

[56] References Cited
UNITED STATES PATENTS
3,678,222  7/1972  Boehly .................... 179/175.31 R
3,069,498  12/1962  Frank ............................. 178/69 A
3,083,270  3/1963  Mayo ....................... 179/175.31 R
3,062,927  11/1962  Hamori ..................... 179/175.31 R Primary Examiner—William C. Cooper
Assistant Examiner—Douglas W. Olms
Attorney—E. F. Wenderoth et al.

[57] ABSTRACT

An apparatus for testing systems and networks for data transmission by simulation, comprising a character generator of arranged to generate under control a pre-fixed sequence of characters; comparator means for comparing the characters produced by said generator with a sequence of received characters; means for controlling a transmission of the sequence of characters produced by said generator consequent to a favourable comparison; means for causing the apparatus to stop operating consequent to an unfavourable comparison.

4 Claims, 7 Drawing Figures

LUCIANO DE VITA and
EMILIO MANCHINI,
INVENTORs

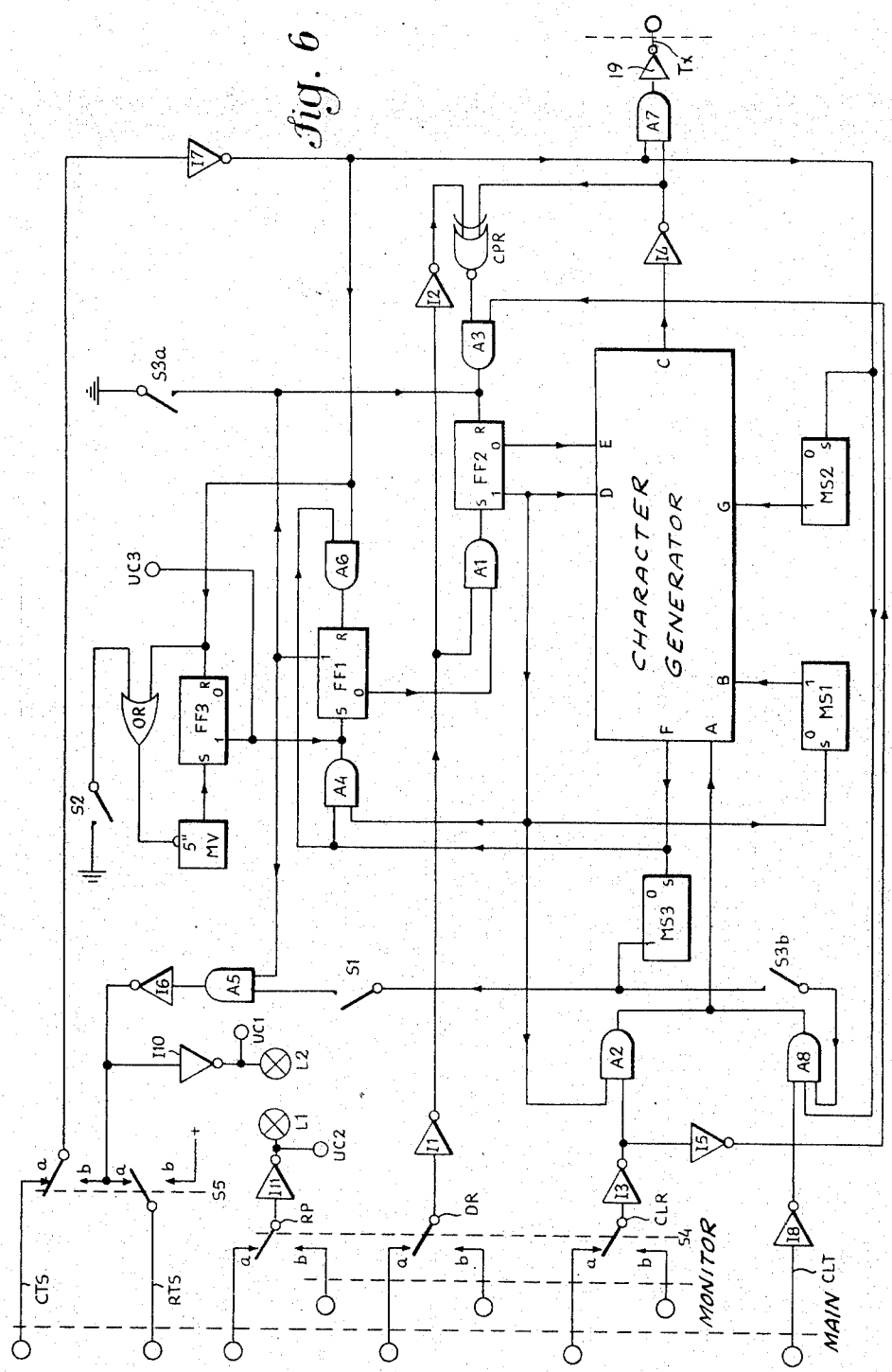

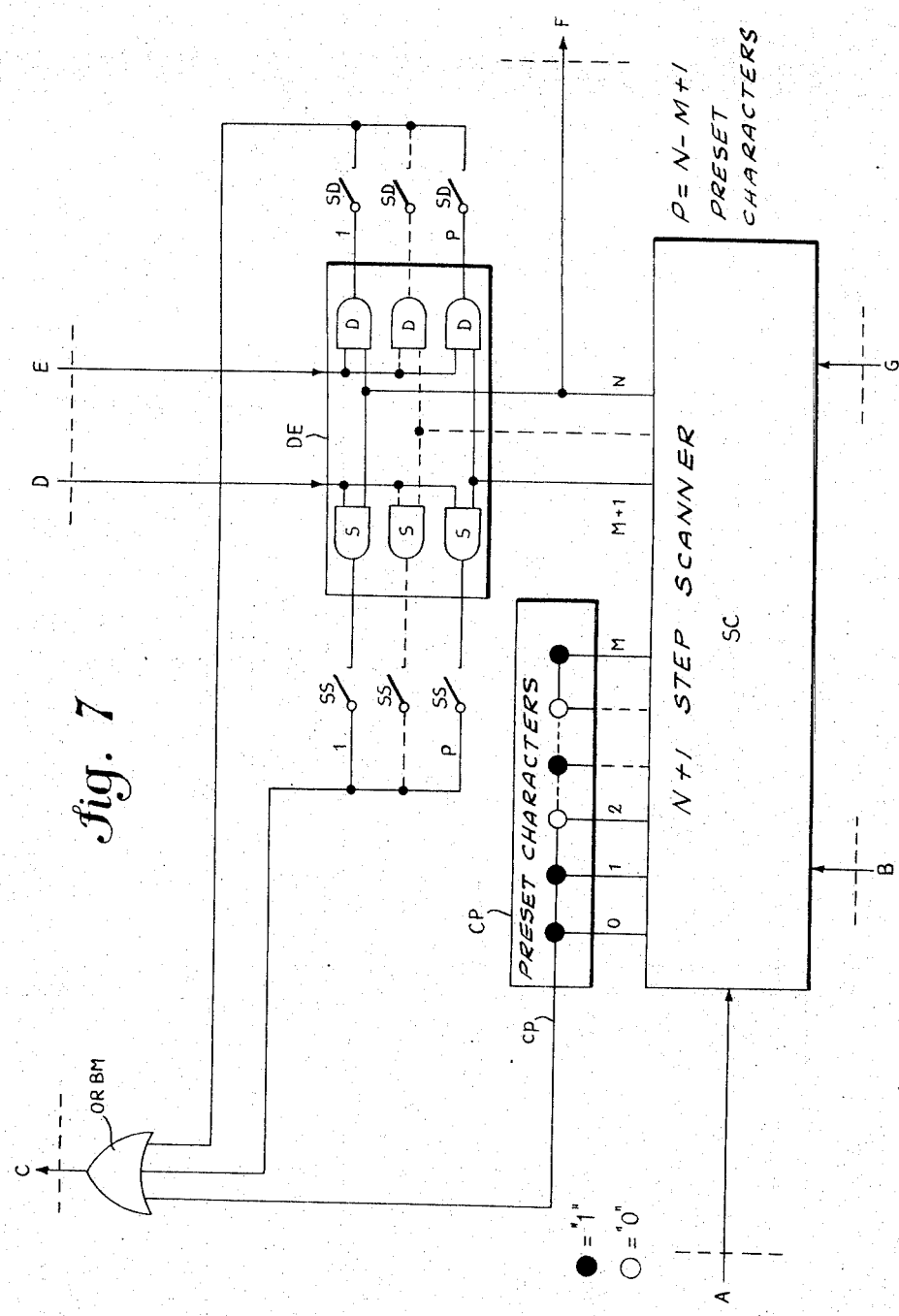

APPARATUS FOR TESTING SYSTEMS AND DATA TRANSMITTING NETWORKS BY SIMULATION

The present invention relates to an apparatus for testing data transmission systems and networks by simulation.

More particularly the present invention relates to an apparatus for testing data transmitting networks and systems, capable of simulating the actual use conditions of "talks" between terminals and a terminal/central processor and vice-versa.

A generic system of high capacity data transmitting includes in its unit a central processor with channels for input and output of data, in series, which is connected to a multiplicity of remote "correspondents" or "data terminals." Between the central processor and the data terminals, a "transmissive system" is interposed. The term "transmissive system" means all components interposed between the data terminals and the central processor, and which can vary from a simple connection of the telephone type, up to the most complex systems of data transmitting and pre-processing, traffic concentrators, etc.

In order to check the effectiveness of a transmissive system several types of tests which can be classified as follows are generally carried out:

Tests of the transmission physical channel (telephone channel);

tests of the transmission channel from "modem" to "modem;"

tests of the entire transmissive system from the central data terminal to the peripheral terminals.

The tests on the telephone channel are carried out according to known and conventional techniques. Likewise for the tests of the transmission channel from "modem" to "modem." The satisfactory result of these tests is however insufficient to ensure the effective operation of the system when the data terminals and the terminal of the central processor are connected.

It is therefore necessary to carry out a further group of tests, as aforesaid, on the entire transmissive system from the central data terminal to the peripheral terminals and vice-versa.

These further tests are normally carried out by utilizing the computer itself with diagnostic functions or "test" functions, since testing instruments suitable to this purpose do not exist up to now. The method of utilizing the computer itself is subject to very severe criticisms; first, to be taken into consideration are the very high costs of the "computer time" which is generally a high capacity computer in order to be in a position of carrying out its common tasks of information processing; a second criticism concerns the fact that the diagnostic capacities carried out by a substantially "rigid" computer are not very great; a third criticism is related to the doubt that in the presence of operation errors of the apparatus, said errors might be produced by misoperation of the computer itself (machine and/or programs).

Taking account of the above comments it is now evident the need of using novel techniques based on the utilization of instruments capable of simulating univocally and completely the operation of the computer and/or of the data terminals as seen by the telecommunication network.

At the base of the present invention exists the fact that under the view point of the telecommunication networks the function of the computer and of the data terminals is that of effecting an exchange of messages between themselves. By embodying an instrument capable of exchanging rhythmically a single type of message and ascertaining if it is exact or not, it will be possible to test in a simple manner all functions and therefore the total effectiveness of the telecommunication network. Furthermore, in case of misoperation of the network, by an instrument of the related kind always sending the same kind of message, the network will be rhythmically operated, whereby it will be remarkably easier to observe and to search the defects.

The purpose of the present invention is therefore that of supplying an instrument of the related kind, capable of producing a type message, repetedly, and simultaneously of simulating the functions of a central terminal (computer) and the functions of data terminals.

According to the present invention an apparatus is provided for testing systems and networks for the transmission of data by simulation, characterized in that it comprises: a character generator arranged so as to generate, upon control, a pre-fixed sequence of characters; comparing means for comparing the characters produced by said generator, with a sequence of received characters; control means for a transmission of the sequence of characters produced by said generator, consequent to a favourable comparison; means for stopping the operation of said apparatus consequent to an unfavourable comparison.

The present invention will now be described with reference to one embodiment at present preferred, disclosed by way of non limitative example, and with reference to the attached drawings wherein:

FIG. 6 shows a detailed block diagram of the test apparatus according to this invention; and FIG. 7 shows the block diagram of one unit included in the diagram of FIG. 6.

Figure 1:
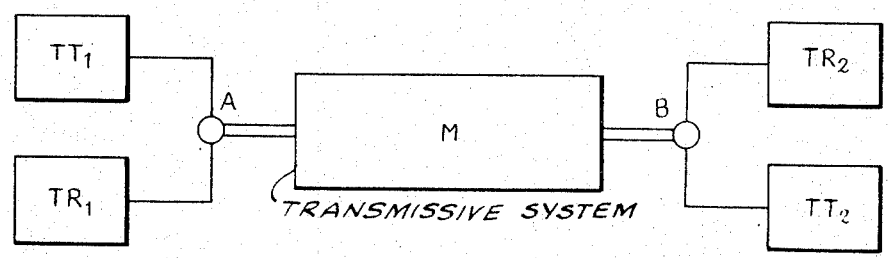
FIG. 1 shows a typical configuration of a bilateral talk between data terminals.
Figure 2:
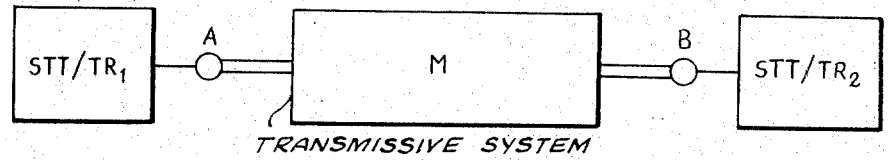
FIG. 2 shows a typical configuration of unilateral talk between data terminals.

With reference to the drawings, and particularly to FIGS. 1 and 2, a generic system for the transmission of data can include an arrangement of bi-directional talk (FIG. 1), including on one side a transmitting terminal TT1, and a receiving terminal TR1, which through a coupler A are connected to a transmissive system M which as aforesaid can be of almost any kind whatsoever, i.e. it can vary from a common telephone data transmission channel up to intermediate data processors, traffic concentrators and the like.

At the other end of the transmissive system M are located a transmitting terminal TT2 and a receiving terminal TR2, connected through the coupler B to the transmissive system.

In the arrangement shown in FIG. 2, the transmissive system M connects sole transmission units STT or sole reception TR2 or vice-versa STT, TR1.

The test apparatus according to the present invention is made so as to be capable of being inserted in the system of FIGS. 1 and 2 instead of a receiving terminal or a transmitting terminal or both.

Figure 3:
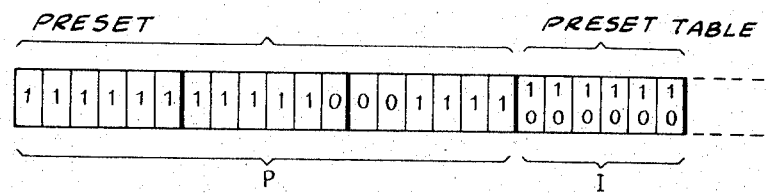
FIG. 3 shows a typical elementary message format.

The apparatus according to the present invention in one embodiment at present preferred is arranged for operating with a standard message formed by four characters of six bits, wherein the first three characters have a pre-established configuration and the fourth character can be manually present on the apparatus itself. The character which can be preset is known as IA (interchange address) when received, and NIA (nest interchange address) when transmitted. FIG. 3 shows the format of the standard test message, which as aforesaid includes three pre-established characters P and a presettable character I.

Figure 4:
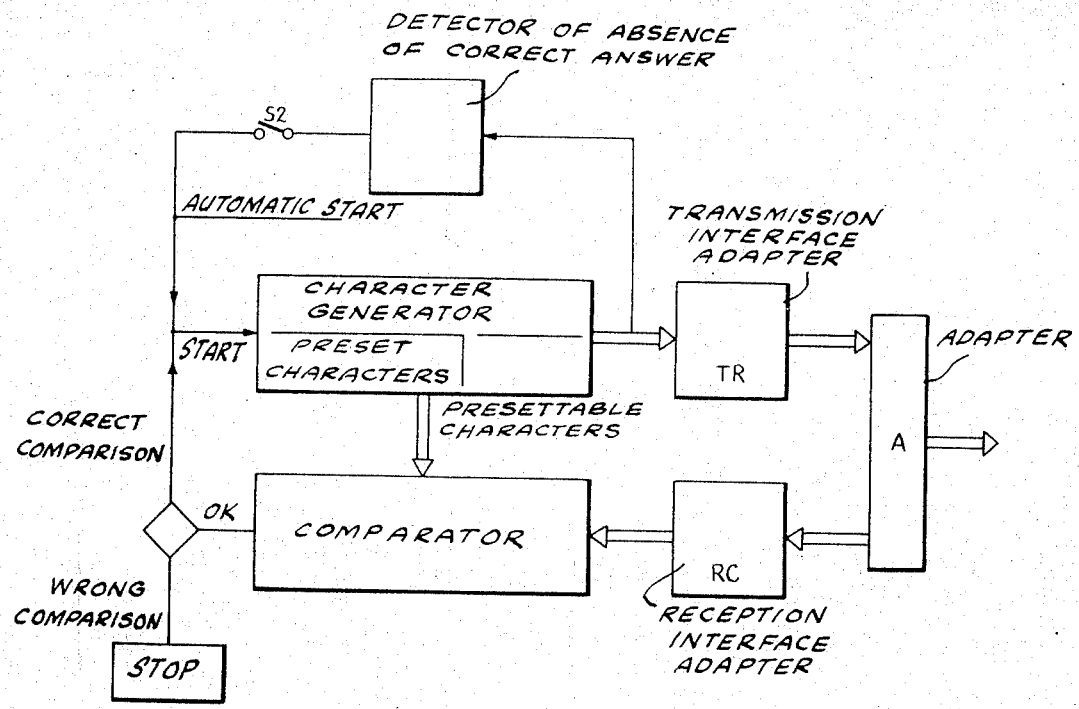
FIG. 4 shows a first criterion of operation of the test apparatus according to this invention.

FIG. 4 shows the operation diagram of the apparatus in a first operative manner. A character generator is provided supplying pre-established characters and pre-settable characters according to the format of FIG. 3. The character generator, through a transmission interface adapter transmits through the combiner on the trans missive system. When received, the signals coming from the transmissive system, after being passed through the adapter A pass through the reception interface adapter, in order to reach a comparator to which arrive characters from the generator which operates as a standard generator. If the comparison is favourable, through a decision circuit, a new transmission will be imparted. If the comparison is unfavourable a stop signal will be produced. A variation consists in introducing a detector of the absence of correct response due to a transmission controlling a repetition of transmission.

Figure 5:
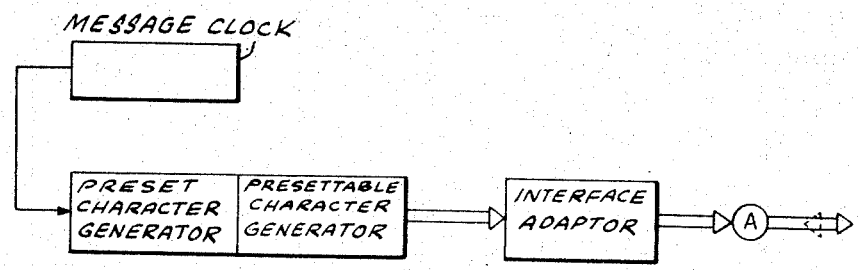
FIG. 5 shows a second criterion of operation of the test apparatus according to this invention.

FIG. 5 shows a second operative way according to which the test apparatus continuously emits messages towards the transmissive system.

With reference, now, to FIGS. 6 and 7, the detailed block diagram of the apparatus according to the present invention will be described.

FIG. 7 shows a frame showing the generator of the preestablished and presettable characters producing the test message proper.

As shown in FIG. 7, said generator includes a scanner SC having a number of steps corresponding to the total number of bits of the message plus one. Said scanner SC produces at its outputs O, 1, 2, ... M,M+1, ... N, sequentially, a pulse in register with its driven stepping on the wire A by a clock generator coming from the transmission terminal (not shown in the figure).

One part of said outputs, 0, 1, 2, ... M is connected to one unit CP for producing pre-established characters, allowing or not the transit of the signals appearing on said outputs from the scanner SC towards a conductor cp according to the presetting of the unit CP.

The presetting of the unit CP can be effected for instance by a pre-fixed distribution of diodes which repeats the configuration of the bits of the fixed part of the test message. The wire cp is carried to one of the inputs of the OR gate denoted by OR BM.

The remaining part of the outputs from the scanner SC, from M+1 to N is carried to an electronic switch DE which by means of the AND gates D and S connects said outputs from the scanner SC to the switches SS or SD. As will be disclosed later on, an enabling signal on the conductor D or E will then produce a "receiving message" or a "transmitting message" with the presettable characters.

The number of switches SS and SD corresponds to the numbe of bits which can be preset, and by their opening or closing pre-dispose the configuration of the variable part of the message.

The common connections of the switches SS, SD are lead to the other two inputs of the OR gate shown by OR BM.

It will be therefore seen that in register with the clock sent to the connection A series messages will be obtained, each formed by N bits. To the scanner SC arrive also the conductors B and G. The conductor B applies a "preset" to the scanner SC for the reasons which will be explained later on. The conductor G causes the complete cancellation of possible stepping states of said scanner SC as it will be shown later on.

The "last step" output N is connected to the conductor F for the function as hereinafter shown.

With reference to FIG. 6, the remaining part of the apparatus using the character generator, just shown, will now be described.

The unit is provided with an input terminal for the received data DR, one output terminal for the sent data TX, an input for the receiving clock CL R and a transmission clock CL T. Also are provided the terminals CTS (clear to send) and RTS (request to send).

A terminal RP supplies a presence signal carrying in reception.

In the receiving stage, the signals arriving on the terminal DR, pass through the inverter I1, the output of which is connected to a first input of the gate AND A1, to the input of a second inverter I2, the output of which is connected to the first input of the comparator CPR consisting of an "EXCLUSIVE OR" circuit.

Assuming the flip-flop FF1 is in ZERO condition, the first positive front of the received data, through the AND gate A1 causes the passage to SET the flip flop FF2, the outputs of which ONE and ZERO are connected to the terminals D and E respectively of the previously described character generator. The ONE output of the flip flop FF2 is also connected to a first input of the AND gate A2 in order to allow the passage of receiving clock pulses which come to the terminal CL R, inverted by the inverter I3 towards the AND gate A2 the output from which is applied to the terminal A of the character generator. The ONE output from the flip flop FF2 comes also to the input S controlling the circuit MS1, which sending a pulse to the terminal B of the character generator presets it on the first step (in order to avoid the effects of the crossing of the wave front and the consequent loss of the first step). As the flip flop FF2 is in the ONE condition, the presettable signals preset by the switches SS of FIG. 7 will be enabled.

At this moment starts the comparison proper of the received configuration with the local one. It occurs bit by bit, while the character generator produces the local message.

The comparison occurs in the comparator CPR whereon come the receiving data, as aforesaid, and the local data available on the output C of the character generator after inversion in the inverter I4.

At this point two alternatives occur. If the received message corresponds to that locally produced, there is no output from the comparator CPR, and the apparatus continues the test of the received message. In the presence of an error, the output from the comparator CPR is applied to a first input of the AND gate A3 on the other input of which arrive the reception clock pulses inverted by the inverter I5 processed in a known way in order to operate as "strobes."

Consequently, in the presence of an output from the comparator CPR there is an output from AND A3 which re-sets the flip flop FF2, which disables the AND A2 cutting out the forwarding of clock pulses to the character generator which will be thus blocked in correspondence with the wrong bit. With the start of the reception of a novel message the test starts again. If the test is favourable, there will be an output at the terminal F of the character generator which denotes the completion of the favourable test of a message. At this point the output signal on the terminal F is applied to the first input of the AND gate A4 which is enabled on its other input by the ONE position of the flip flop FF2. Thus the flip flop FF1 will be set which by its ONE output applied to the gate AND A5 generates a signal which, inverted by the inverter I6, is applied through the switch S5 (the function of which will be described later on) in order to send a message of "request to send" RTS to the transmissive system which supplies, after a certain time variable according to the characteristics of the system, a signal "clear to send" CTS which through the switch S5 and the inverter I7 reaches the AND A6, the AND A7 and the AND A8, and the terminal S controlling the monostable circuit MS2 which cancels the possible stepping stages of the character generator.

The enabling of AND A8 allows the passage of the transmission clock CLT inverted by the inverter I8 towards the input A of the character generator.

The ONE output of the flip flop FF1 is applied to the re-set wire for the flip flop FF2 resetting it and presetting the character generator by applying a signal to the connection E. Now the character generator of produces the transmission message which through the inverter I4 and the AND A7 reaches the final inverter I9 in order to be transmitted through the output TX for being sent to the transmission means. At completion of the cycle of the scanner SC (end of the message) there is a new output on the wire F which is applied to the first input of the AND A6, enabled through the inverter I7 as the signal CTS is still present, said AND A6 resetting the flip flop FF1 in its ZERO condition, which by means of the ONE output, the AND A5, inverter I6 and switch S5 removes to "request to send" RTS. This originates the immediate disappearance of the signal CTS "clear to send" thereby ending the transmission cycle.

Summarizing, the described functions are:
a. Receiving messages and comparing them with a locally produced message and automatic stop in the presence of an error.
b. Sending a message locally produced, as a consequence of the correct reception of a message.

If desired, the function b) can be caused to occur with the introduction of a prefixed delay. This will be obtained by closing the switch S1 which applies the ONE output of the monostable circuit MS3 driven by the terminal F of the character generator, to AND A5 in order to disable it through a prefixed time delaying the sending to the inverter I6 of the signal originating the "request to send" RTS, delaying the start of the transmission cycle.

A warning lamp L1, driven by the inverter I10 displays the presence of the signal "request to send." The output of the inverter I10 can be applied to an output connection UC1 to which can be connected a counter (not shown in the figure) of the send message.

The transmission operation can occur in two ways:
I. Application of the signal "request to send" RTS, waiting for the "clear to send" CTS and then sending the message.
II. Constant sending of the signal "request to send" RTS, and sending of the transmission independently from outer controls.

The first mode of operation is that previously described. In order to preset the second way, the switch S5 will be moved from its position a to its position b whereby a positive voltage will be applied to the terminal RTS and the terminal CTS will be disconnected. Furthermore, the output from the inverter I6 will be switched to the input of the inverter I7 simulating the presence of the "clear to send."

In the apparatus a circuit is provided which in the presence of the sequence "receiving-comparing-presence of error-stop" after a prefixed time interval, for instance 5 seconds, will send automatically a message.

This message will be sent by means of a control produced by the astable multivibrator MV (the cycle of which is for instance 5 seconds) which sets the flip flop FF3 the ONE output of which is applied to the control S of the flip flop FF1, setting it to start the described transmitting cycle. When the "request to send" RTS is sent, this will cause the arrival of the signal "clear to send" CTS which causes the message to be forwarded and through the inverter I7 resets the flip flop FF3. The signal CTS also reaches the gate OR inhibiting the oscillation of the astable multivibrator MV. Clearly, the transmitting cycle is much shorter than the cycle of the multivibrator MV.

The normal operation, through the inverter I7 and the gate OR inhibits continuously the astable multivibrator MV, avoiding its intervention.

If the switch S2 is closed, the multivibrator MV is permanently inhibited and in the presence of an error in reception the apparatus will be locked through an indeterminate time until a new message arrives.

A second mode of operation of the related apparatus will be now described.

This mode consists in the continuative transmission of the same message. This mode is preset by closing the switches S3a, S3b. The closure of the switch S3a sets the flip flop FF1 to its condition causing the signal RTS to be sent, with the consequent appearance, after a certain time of the signal CTS. The signal CTS through the inverter I7 enables the AND gate A8 allowing the transmission clock signal CLT to be sent to the terminal A of the character generator through the inverter I8 and the AND gate A8.

At the end of the transmission cycle of the characters, the end-of-cycle signal F triggers the monostable circuit MS3 the output signal of which through the closed switch S3b, inhibits the AND gate A8 for a prefixed time, introducing a fixed interval between the emissions of the single messages.

If the switch S1 is closed, at each cycle the sequence: sending of the request to send signal RTS, appearance of the consent to send CTS, delay introduced by the monostable circuit MS3, new sending of the signal RTS . . . will be repeated, and so on.

In fact, the closure of the switch S1 disables the gate AND A5 for the time as determined by the monostable circuit MS3. For the time determined by the monostable circuit MS3, the AND gate A8 is disabled. Consequently, the disabling of the AND gate A5 causes the disappearance of the signal RTS and consequently also the disappearance of the signal CTS. At the end of the holding period of the monostable circuit MS3 when the latter comes again to its initial conditions, the CTS signal is still missing and therefore the AND gate A8 is inhibited cutting out the sending of the transmission clock towards the terminal A. Still at the end of the holding time of the monostable circuit MS3 the AND gate A5 will be enabled again and the signal RTS will be sent. After a certain time the signal CTS appears, enabling the AND gate A8 causing a new cycle to be started.

This mode of operation causes, with automatic operation, the interface members of the transmissive system (sending the signal RTS, response with the signal CTS) to be continuously stressed.

To the connection UC2 it is possible to connect a counter in order to count the received messages by detecting the presence of a receiving carrier, which is desplayed with the lamp L2 driven by the inverter I11.

To the connection UC3 it is possible to connect a counter for counting the interventions of the spontaneous sending of a message.

Finally the switch S4 is provided with the positions a,b, which in its position a, presets the connection to the main connector for the operation in DIRECT POLLING; while in the position b, connects the points C1 R, DR, RP to a secondary connector of "monitor" for operation in HUB POLLING.

The present invention has been described with reference to one embodiment thereof at present preferred, but it will be understood that it will be possible to impart thereto modifications and changes by a person skilled in the art, without departing from the scope of the present invention.

Having thus described the present invention, what is claimed is:

1. An apparatus for testing data transmission systems between two or more data terminals, comprising means for generating and storing a call message, including fixed and presettable characters, means for sending said call message, receiving means for receiving an answer message sent in response to said call message from a remote data terminal, and comparator means for comparing said received answer message from said remote data terminal with said stored message; means for repeating the sending of said call message if the received answer message coincides with said stored message, and means for optionally introducing a time delay between the receiving of an answer message which does not coincide with said stored message and the sending of a new call message.

2. An apparatus according to claim 1 further comprising means for the repetitive sending of call messages towards a remote data terminal regardless of the possible answer of the said remote data.

3. An apparatus according to claim 1 further comprising means for the repetitive sending of call messages towards a remote data terminal, regardless of the possible answer of the said remote data terminal, and further including means for introducing a predetermined time delay between the subsequent sending of call messages.

4. An arrangement for testing data transmission systems including at least two data terminals, each of said terminals including a means for generating and storing a call message including fixed and presettable characters, means for sending said call message, receiving means for receiving an answer message sent in response to said call message from said other data terminal, and comparator means for comparing said received answer message from said other data terminal with said stored message; means for repeating the sending of said call message if the received answer message coincides with said stored message, and means for optionally introducing a time delay between the receiving of an answer message which does not coincide with said stored message and the sending of a new call message.

* * * * *